US009214834B1

(12) United States Patent
Lunn et al.

(10) Patent No.: US 9,214,834 B1
(45) Date of Patent: Dec. 15, 2015

(54) AUTOMATIC EMERGENCY LIGHTING LOAD CONTROL

(71) Applicants: Michael Alan Lunn, Peachtree City, GA (US); Jonathon L. Germon, Peachtree City, GA (US); Kishore S. Aligeti, Peachtree City, GA (US)

(72) Inventors: Michael Alan Lunn, Peachtree City, GA (US); Jonathon L. Germon, Peachtree City, GA (US); Kishore S. Aligeti, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/205,153

(22) Filed: Mar. 11, 2014

Related U.S. Application Data

(60) Provisional application No. 61/780,411, filed on Mar. 13, 2013.

(51) Int. Cl.
*H05B 37/00* (2006.01)
*H02J 9/06* (2006.01)
*H05B 37/04* (2006.01)

(52) U.S. Cl.
CPC .. *H02J 9/06* (2013.01); *H05B 37/04* (2013.01)

(58) Field of Classification Search
USPC ............... 315/86, 88, 90, 119, 291, 294, 312
See application file for complete search history.

(56) References Cited

U.S. PATENT DOCUMENTS

| 5,859,499 A * | 1/1999 | McAfee et al. ................. 315/86 |
| 2012/0153828 A1* | 6/2012 | Gordin ............................. 315/86 |
| 2012/0187852 A1* | 7/2012 | Mandy ....................... H02J 9/06 315/175 |
| 2012/0326614 A1* | 12/2012 | Tsuji .................. H05B 33/0845 315/200 R |
| 2014/0132164 A1* | 5/2014 | McBryde et al. ............ 315/187 |

OTHER PUBLICATIONS

Room Controller—Classroom Switching; Cooper Controls; Jan. 10, 2013.

* cited by examiner

*Primary Examiner* — Tung X Le
(74) *Attorney, Agent, or Firm* — King & Spalding LLP

(57) ABSTRACT

An emergency load control device includes a lighting relay that is coupled to a lighting load based on a relay control signal input. Further, the emergency load control device includes an emergency relay that is coupled to an emergency lighting load based on an emergency relay control signal input. Furthermore, the emergency load control device includes a power controller that is coupled to the lighting relay and the emergency relay. The power controller is configured to output the relay control signal input to the lighting relay and the emergency relay control signal input to the emergency relay to control the operation of the lighting load and the emergency lighting load respectively. In addition, the emergency load control device includes a dimmer control circuit coupled to the lighting load and the emergency lighting load. The dimmer control circuit controls dimming of the lighting load and the emergency lighting load.

14 Claims, 4 Drawing Sheets

AUTOMATIC EMERGENCY LIGHTING LOAD CONTROL

CROSS REFERENCE TO RELATED APPLICATIONS

This application claims priority to U.S. Provisional Patent Application No. 61/780,411 filed Mar. 13, 2013 in the name of Michael Alan Lunn, Jonathon L. Germon, and Kishore S. Aligeti and entitled "Automatic Emergency Lighting Load Control," the entire contents of which are hereby incorporated herein by reference.

This application is related to U.S. Provisional Patent Application No. 61/780,400 filed Mar. 13, 2013 in the name of Michael Alan Lunn, Jonathon L. Germon, and Kishore S. Aligeti and entitled "Integrated Lighting Load and Skylight Control," the entire contents of which are hereby incorporated herein by reference.

TECHNICAL FIELD

This disclosure relates generally to electrical lighting and, in one example embodiment, to a system, method and an apparatus for automatic emergency lighting load control.

BACKGROUND

Lighting installations may include lighting fixtures (e.g., lighting fixtures with 0-10V dimmers) and dimmer circuits to control the intensity (e.g., brightness) of the light emitted from the lighting fixtures. Controlling the intensity of light may be desirable in numerous circumstances. For example, when a video is presented using a projector, to provide a clear view of the projected presentation material, a user may desire to reduce an intensity of the light (from the lighting fixtures) in the space (e.g., room) where the presentation is held. Further, in addition to the lighting fixtures, the lighting installations may include emergency lighting fixtures (e.g., 0-10V emergency lighting fixtures) to provide a secondary lighting source during a power outage.

Conventional technology may not provide an integrated control to operate both the lighting fixtures and the emergency lighting fixtures from one user panel. Conventional technology may require one device to control the lighting fixtures and another device (e.g., UL924 devices) to control the emergency fixture. The installation of each of these devices may be complex in that the installation may include complex wiring (e.g., installation of the UL924 may require additional wiring of connections to utility lines, switch input wires, emergency power lines, etc.). Further, conventional technology may not be configured to operate the lighting fixtures, the dimming circuits, and the emergency lighting fixtures synchronously. When the operations of the lighting and the emergency lighting fixtures are not synchronized, they may provide inconsistent lighting in a given space. For example, when a lighting fixture is dimmed to 50% intensity, the emergency lighting fixture may continue to operate at a different intensity.

Conventional technology may require installation of other additional devices (e.g., external devices such as automatic relay controls) that may include additional complex wiring to operate the emergency lighting fixtures synchronously with the lighting fixtures and dimming circuits. Further, conventional technology may require other additional complex wiring to ensure that the emergency lighting fixture changes to emergency mode brightness responsive to a power outage. For example, the lighting fixtures and the emergency lighting fixtures may operate at a 50% intensity prior to a power outage and once the power outage occurs, the emergency lighting fixtures may continue to emit light at 50% intensity, when a 100% intensity is desired.

The above-described complex installation of more than one device may be both time consuming and cost intensive in terms of labor cost, material cost, and/or installation cost. Thus, there is a need for an automatic emergency load control technology to overcome the shortcomings of a conventional technology.

SUMMARY

The present disclosure can address the needs described above by an automatic emergency lighting load controller. In one aspect, an automatic emergency load control device includes a lighting relay that is adapted to be coupled to a lighting load based on a relay control signal input. Further, the automatic emergency load control device includes an emergency relay that is adapted to be coupled to an emergency lighting load based on an emergency relay control signal input. In addition, the automatic emergency load control device includes a power controller that is coupled to the lighting relay and the emergency relay. The power controller is configured to output the relay control signal input to the lighting relay and the emergency relay control signal input to the emergency relay to control the operation of the lighting load and the emergency lighting load respectively. Furthermore, the automatic emergency load control device includes a dimmer control circuit coupled to the lighting load and the emergency lighting load and configured to control dimming operations associated with the lighting load and the emergency lighting load.

In another aspect, a system includes one or more sensors to determine lighting characteristics of a monitored space. The monitored space may be any physical volume that is monitored by the one or more sensors, such as a room in a building, an outdoor area surrounding a building, etc. In addition to the one or more sensors, the system includes a user input panel to receive a selection of a mode of operation desired by a user. The different modes of operation may include a half light mode (where the dimmer is set to 50%, or only half the lights are switched on), a full light mode (turning on all lights, or switching all lights to full brightness), undercabinet mode, raise mode (to raise the intensity of the lights (e.g., press and hold or in 5% step increments)), lower mode, and/or all off mode (to switch off all lights or actuate test mode). Further, the system includes an emergency room controller that can control the operation of a lighting load and an operation of an emergency lighting load that is associated with lighting the monitored space. The operations of the lighting load and the emergency lighting load are controlled based on the availability of utility power. That is, when utility power is available, the emergency room controller controls the operations of the lighting load and the emergency lighting load such that they operate in unison. The operations and change in operations of the lighting load and the emergency lighting load may be based on at least one of the lighting characteristics of the monitored space received from the one or more sensors and the mode of operation desired by the user received from the user input panel. In said system, the one or more sensors, the user input panel, the room controller, the lighting load, and the emergency lighting load are arranged as follows: the user input panel and the one or more sensors are coupled to an input of the emergency room controller, and one or more outputs of the emergency room controller is coupled to an input of the lighting load and an input of the emergency lighting load.

In yet another aspect, a method of an automatic emergency load control device includes determining availability of utility power at the automatic emergency load control device using a processor of the automatic emergency load control device. Further, the method includes controlling, when utility power is available, an operation of a lighting load and an operation of an emergency lighting load such that the lighting load and emergency lighting load operate in unison. When utility power is interrupted, the method includes delivering an emergency power to the emergency lighting load to switch a light source associated with the emergency lighting load to full brightness. Additionally, when utility power is interrupted, light sources that are driven by the utility power, such as light sources associated with the lighting load may be switched off.

These and other aspects, features and embodiments of the disclosure will become apparent to a person of ordinary skill in the art upon consideration of the following detailed description of illustrated embodiments exemplifying the best mode for carrying out the disclosure as presently perceived.

BRIEF DESCRIPTION OF THE DRAWINGS

Example embodiments are illustrated by way of example and not limitation in the figures of the accompanying drawings, in which.

Figure 1A:
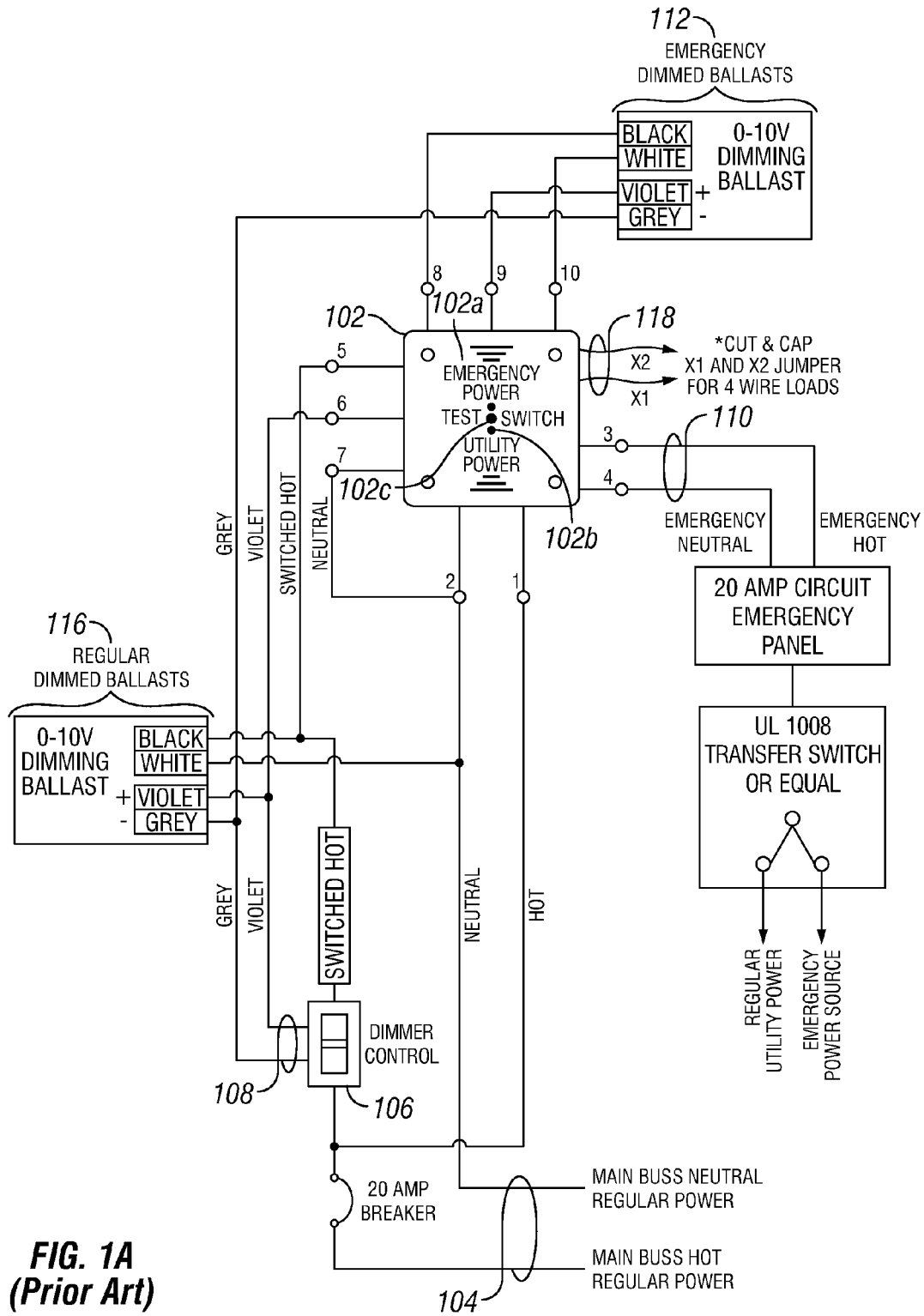
FIGS. 1A and 1B (collectively "FIG. 1") illustrates an example of a schematic diagram of a prior art emergency power control device.

Many aspects of the disclosure can be better understood with reference to the above drawings. The elements and features shown in the drawings are not to scale, emphasis instead being placed upon clearly illustrating the principles of example embodiments of the present disclosure. Moreover, certain dimensions may be exaggerated to help visually convey such principles. In the drawings, reference numerals designate like or corresponding, but not necessarily identical, elements throughout the several views. Other features of the present embodiments will be apparent from the Detailed Description that follows.

DETAILED DESCRIPTION OF EXAMPLE EMBODIMENTS

Disclosed are a system, a method and an apparatus for automatic emergency lighting load control. It will be appreciated that the various embodiments discussed herein need not necessarily belong to the same group of example embodiments, and may be grouped into various other embodiments not explicitly disclosed herein. In the following description, for purposes of explanation, numerous specific details are set forth in order to provide a thorough understanding of the various embodiments.

The present disclosure can be embodied in many different forms and should not be construed as limited to the embodiments set forth herein; rather, these embodiments are provided so that this disclosure will be thorough and complete, and will fully convey the scope of the disclosure to those having ordinary skill in the art. Furthermore, all "examples" or "example embodiments" given herein are intended to be non-limiting and among others supported by representations of the disclosure.

An automatic emergency lighting load control system may include an automatic emergency lighting load controller. The automatic emergency lighting load controller may include an emergency power control circuit (e.g., UL924 emergency relay). The emergency power control circuit may be configured to switch from a normal mode of operation to an emergency mode of operation responsive to detecting an interruption in a utility power supply or a power outage. When the utility power supply to the automatic emergency lighting load controller is interrupted, the emergency power control circuit may be configured to be coupled to an emergency power supply. In addition, when a utility power is interrupted, the automatic emergency lighting load controller is automatically closed and the dimmer control signal to the emergency lighting fixtures are removed, forcing the emergency lighting fixture to full bright.

The emergency power control circuit may be pre-programmed to operate an emergency lighting load in conjunction with at least one normal lighting load such that both emergency and normal lighting in a space may be switched on, off and dimmed in sync allowing for a more consistent lighting in a given space. In other words, when the normal lighting fixture is 'on', 'off' or dimmed the emergency lighting fixture is on, off or dimmed respectively. Wiring associated with the automatic emergency lighting load controller may be color coded for easy installation.

FIG. 1 illustrates a schematic diagram of a prior art emergency power control device (herein 'conventional EPC'), according to certain example embodiments. In particular, FIG. 1 illustrates a conventional EPC 102, utility power supply wiring 104, dimmer control 106, dimmer control output wire 108, regular dimming ballast 116, emergency power supply wiring 110, emergency dimming ballast 112, and electrical jumper wires 118. Further, FIG. 1 illustrates an internal diagram of the circuit connections within the conventional EPC 102.

Wiring of the Conventional EPC

The conventional EPC 102 includes a number of input/output ports. In the example embodiment illustrated in FIG. 1, the conventional EPC 102 has 10 input/output ports. As illustrated in FIG. 1, port 1 and port 2 are coupled to the utility power supply wiring 104, wherein port 1 receives input from the utility power 'hot' wire while port 2 receives input from the corresponding neutral wire. Further, port 3 and port 4 are coupled to the emergency power supply wiring 110, wherein port 3 receives input from the emergency power 'hot' wire and port 4 receives input from the corresponding neutral wire. Port 7 receives input from the utility power neutral wire that is also coupled to Port 2. Further, port 6 is coupled to the dimmer control output wire 108 that is output from the dimmer control 106. In an example embodiment, the dimmer control 106 may be a 0-10V dimmer control and the dimmer control 106 output may be a low voltage signal.

The output from the dimmer control 106 may be referred to as the dimmer control signal. The dimmer control signal may be carried over the dimmer control output wire 108, wherein the violet output line illustrated in FIG. 1 is a 0-10V dimmer control wire that carries the low power output voltage of 0-10V. The violet output line provides input to the regular dimming ballast 116 that is in turn coupled to the normal lighting fixture. Further, the violet output line provides input to port 6 of the conventional EPC 102. The conventional EPC 102 internally couples the dimming control signal received at port 6 over the violet output line to an output port 9 of the conventional EPC 102. Port 9 may be coupled to the emergency dimming ballast 112 which is in turn coupled to an emergency lighting fixture to provide dimming control signals to the emergency dimmer ballast 112. In other words, the same dimmer control signal may be provided both to the regular dimmed ballast 106 and the emergency dimmed ballast 112 in order to synchronously control the light intensity of both the normal lighting fixtures and the emergency lighting fixtures.

The term "normal lighting fixture" herein generally refers to any lighting fixtures other than the emergency lighting fixtures. However, one of ordinary skill in the art can understand that in some embodiments, one or more normal lighting fixtures may be used as emergency lighting fixtures.

Further, port 5 of the conventional EPC 102 may be configured to receive input from the 'switched hot' wire from the output of the dimmer control 106. The 'switched hot' wire also provides an input to the regular dimming ballast 116. The switched hot wire may carry operational voltage that may drive both the normal lighting fixture and the emergency lighting fixture. Ports 8 and 10 may be configured as output ports that provide either emergency power or operational voltage (normal power) to the emergency dimming ballast 112 based on a mode of operation of the conventional EPC 102. The operation of the conventional EPC 102 will be described in greater detail in the following paragraphs.

In addition to the input/output ports, the conventional EPC 102 includes a test switch 102c, and a pair of indicators 102a and 102b, that visually indicate whether the lighting fixtures are operating on utility power or emergency power. The test switch 102c can be triggered to force the conventional EPC 102 to switch to an emergency power mode for test purposes. Actuating the test button 102c may require physical access to the conventional EPC 102, i.e., if the conventional EPC 102 is installed on the ceiling of a room, a technician may need to get a ladder or find other mechanisms to reach the conventional EPC 102 to start a test operation which could prove to be cumbersome.

Figure 1B:
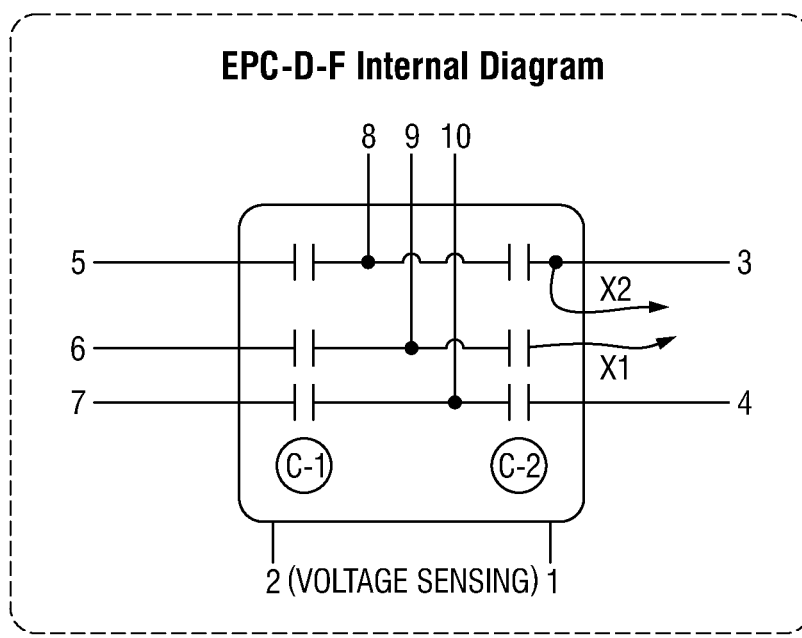

Further, the conventional EPC 102 includes input ports for a pair of electrical jumper wires 118, illustrated as X1 and X2 in FIG. 1. When operating the conventional EPC 102 in conjunction with a 0-10V 4-wire dimmable load, the jumper wires 118 may be cut and capped to internally break the circuit and shunt the power from the emergency power supply wiring 110 to the emergency lighting fixtures via the emergency dimming ballast 112, when utility power is interrupted. Cutting and capping the jumper wiring 118 disrupts the circuit connection between port 3 and port 6 as illustrated in the internal diagram of the conventional EPC 102 (shown in FIG. 1B). In other operations, such as operations outside the 0-10V dimming zone, or operations using 2-wire dimmable load, and/or 3-wire dimmable load, the X1 and X2 wires of the jumper wiring 118 may be connected to each other.

Operation of the Conventional EPC

In an example embodiment, the conventional EPC 102 may have two modes of operation, one being a normal mode and the other being an emergency mode. The normal mode of operation may generally refer to a mode of operation where utility power is available for operation of the lighting fixtures (both regular and emergency), and the emergency mode of operation may generally refer to a mode of operation where the utility power supply is interrupted.

In the normal mode of operation, utility power is provided to the dimmer control 106 for supporting operation of the dimmer control 106. Further, the dimmer control 106, that receives the utility power, may output operational voltage (utility power) for both the regular dimming ballast 116 and the emergency dimming ballast 112. Referring to the internal diagram of the conventional EPC 102, the input to port 5 is connected to port 8 which provides power to the emergency dimming ballast 112. The switched hot wire coupled to port 5 of the conventional EPC 102 may link both the emergency lighting fixture and the normal lighting fixture. In other words, in the normal mode of operation, the switching on and switching off of the emergency lighting fixtures and the normal lighting fixtures may be controlled synchronously by the operational voltage which is fed both to regular dimming ballast 116 and the emergency dimming ballast 112.

In addition to the operational voltage, the dimmer control 106 may output low voltage dimmer control signals that control the dimming operation of the normal lighting fixture. The low voltage dimmer control signal outputted from the dimmer control may also be fed to the conventional EPC 102 via port 6. Internal to the conventional EPC 102, the low power dimmer control signal may be coupled to an output port 9 of the conventional EPC 102, which in turn is coupled to the emergency dimming ballast 112. In other words, in the normal mode of operation, the light intensity of the emergency lighting fixtures and the normal lighting fixtures may be controlled synchronously by the dimmer control signal which is fed both to regular dimming ballast 116 and the emergency dimming ballast 112.

In one embodiment, the conventional EPC 102 receives the utility power supply at port 1 and port 2 of the conventional EPC 102. Port 1 and port 2 of the conventional EPC 102 may be internally coupled to a voltage sensing mechanism. The voltage sensing mechanism may be configured to determine an interruption in the utility power and consequently switch to an emergency power mode. When the voltage sensing mechanism at port 1 and port 2 detects an interruption in utility power supply, the conventional EPC 102 may switch to an emergency power mode.

In the emergency power mode, both the operational voltage (utility power) and the low voltage dimmer control signal may be interrupted. Consequently, the low voltage dimmer control signal coupled to the emergency dimming ballast 112 via port 9 and the operational voltage coupled to the emergency dimming ballast 112 via port 8 and 10 gets interrupted as well. Interruption of the low power dimmer control signal at port 6 and consequently port 9, and the operational voltage from port 8 may cause the emergency lighting fixtures to go to full brightness. In the emergency power mode, the emergency lighting fixtures may be operated on emergency power supply received at port 3 and port 4 of the conventional EPC 102.

Automatic Lighting Load Control System

Figure 2:
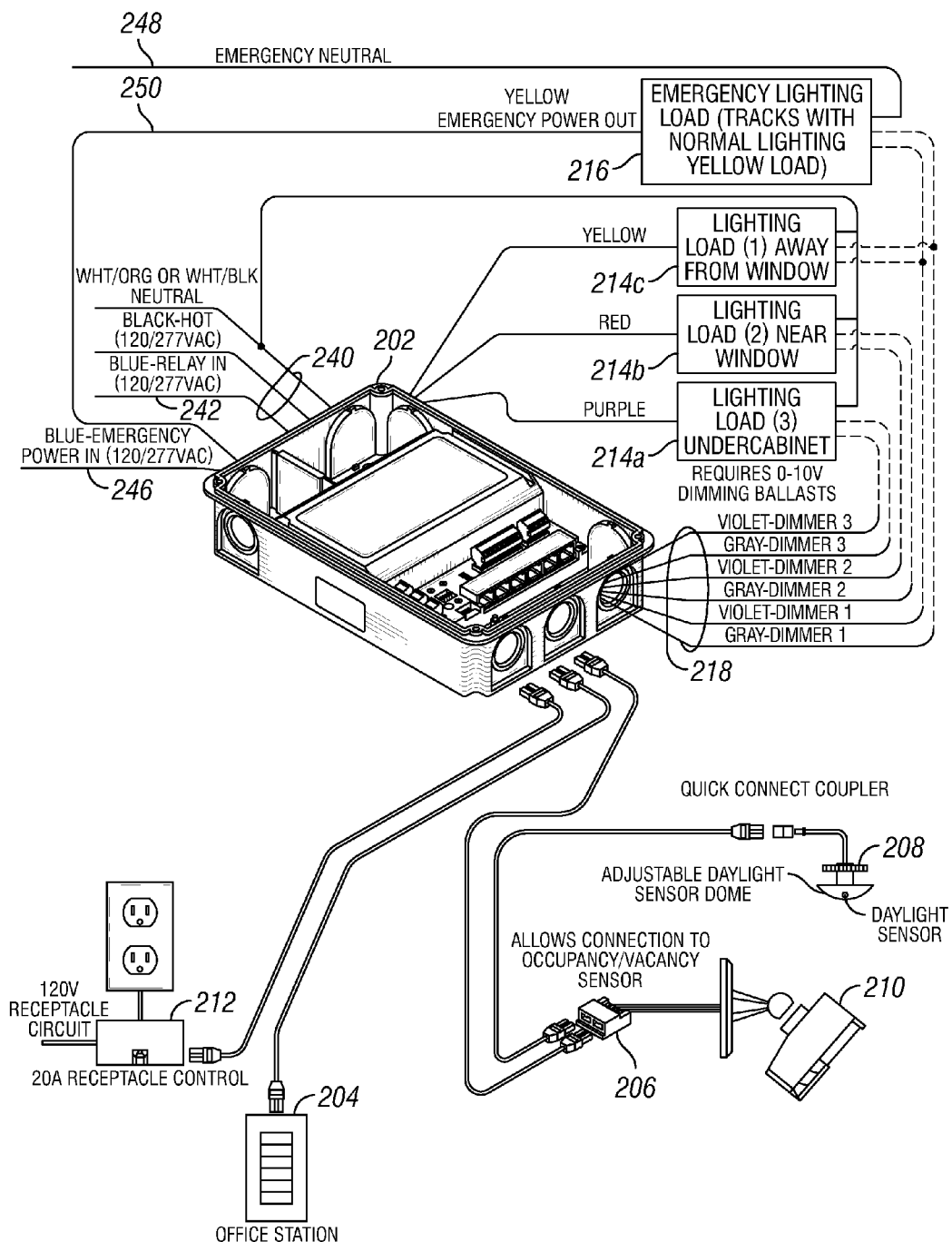
FIG. 2 illustrates a schematic diagram of an automatic emergency lighting load control system, according to certain example embodiments of the present disclosure.

FIG. 2 illustrates a schematic diagram of an automatic emergency lighting load control system, according to certain example embodiments. In particular, FIG. 2 illustrates an automatic emergency lighting load controller 202 (herein 'emergency controller'), emergency power supply wiring 246 and 248, utility power supply wiring 240, an emergency power output wire 250, a lighting load 1 214c, a lighting load 2 214b, a lighting load 3 214a, an emergency lighting load 216, dimmer control wiring to the lighting loads 218, a user interface panel 204, a receptacle control 212, a sensor coupler 206, an occupancy/vacancy sensor 210, and a daylight sensor 208.

In one embodiment, as illustrated in FIG. 2, the automatic emergency lighting load control system may include an occupancy/vacancy sensor 210 (herein 'O/V sensor') that may be coupled to the emergency controller 210. The ON sensor 210 may be configured to determine the presence or absence of occupants in a monitored space and send corresponding signals to the emergency controller 202 to take suitable actions. Upon receiving a signal from the ON sensor 210, the emergency controller 202 may effect a change in the operation of lighting fixtures within the monitored space, provided the lighting fixtures in the monitored space are associated with and controllable by the emergency controller 202. For example, when there is no person in a room, the ON sensor 210 may determine that the room is vacant and transmit a corresponding signal to the emergency controller 202. Upon receiving said signal, the emergency controller may dim or switch off the lighting fixtures (both normal and emergency) in the monitored space for maximum energy saving.

In addition, the automatic emergency lighting load control system may include a daylight sensor 208. The daylight sensor 208 may be coupled to the emergency controller 202 and configured to determine the intensity of daylight available in a monitored space. On the basis of the determination, the daylight sensor 208 may send a signal to the emergency controller 202, responsive to which the emergency controller 202 may actuate a dimming functionality to change the operation of the lighting fixtures in the monitored space. For example, when the daylight sensor 208 determines that the intensity of daylight is high within a monitored space, the daylight sensor 208 may send this information to the emergency controller 202. Responsive to receiving said information, the emergency controller 202 may dim the lighting fixtures to a lower light intensity, for example half brightness or 50% intensity.

When utility power is uninterrupted, the change in operation of the lighting fixtures as described herein may generally refer to switching on, switching off, and/or changing an intensity (e.g., dimming) of the light emitted from both the lighting fixtures and the emergency lighting fixtures. In some embodiments, each lighting fixture may be individually controllable.

In an example embodiment, the sensors (O/V sensor 210 and/or daylight sensor 208) described herein may be coupled to the emergency controller 202 via a CAT 5 cable. One of ordinary skill in the art can understand and appreciate that the CAT5 cable may be replaced by any other appropriate type of cable capable of carrying data from a sensor to the emergency controller 202. In some embodiments, the data from the sensor can be transmitted wirelessly provided the emergency controller 202 has a wireless communication facility.

Further, in the embodiment illustrated in FIG. 2, the automatic emergency lighting load control system may include a sensor coupler 206 for coupling both the O/V sensor 210 and the daylight sensor 208 to the emergency controller through one cable to reduce wiring complexities. The sensor coupler 206 may include click and go ports to receive wiring from the sensors. In some embodiments, each sensor can be individually coupled to the emergency controller 202 bypassing the sensor coupler 206.

In addition to the sensors, the automatic emergency lighting load control system includes a user interface panel 204 (herein 'UI panel') that is user manipulatable and is coupled to the emergency controller 202. The UI panel 204 maybe configured to receive user input and transmit the user input to the emergency controller 202. Responsive to receiving the user input, the emergency controller 202 may adjust an operation of lighting fixtures associated with the emergency controller 202 based on the received user input.

In one example embodiment, the UI panel 204 may include a touch screen interface that can receive a tactile input from a user to select various modes of operation of the lighting fixture as desired by a user. One of ordinary skill in the art can understand and appreciate that the touch screen may be replaced by any other suitable input interface such as a gesture recognition interface, a switch interface, a button interface, etc. The different modes of operation of the lighting fixtures available on the UI interface 204 may include, but are not limited to, half light (where the dimmer is set to 50%, or only half the lights are switched on), full lights (turning on all lights, or switching all lights to full brightness), undercabinet mode, raise mode (to raise the intensity of the lights (e.g., press and hold or in 5% step increments)), lower mode (to lower the intensity of the lights (e.g., in 5% step decrements), and/or all off mode (to switch off all lights or actuate test mode).

Further, the automatic emergency lighting load control system includes a receptacle control 212. The receptacle control device 212 described herein may be coupled to the emergency controller 202 via a CAT 5 cable. One of ordinary skill in the art can understand and appreciate that the CAT5 cable may be replaced by any other appropriate type of cable capable of carrying data from a receptacle control device to the emergency controller 202. The receptacle control device 212 is automatically controlled by the emergency controller 202, based on occupancy signal it receives from the O/V sensor 210.

In one example embodiment, the receptacle control device 212 automatically switches the receptacle plug loads based on occupancy signal from the O/V sensor 210.

In one embodiment, the emergency controller 202 may be coupled to and configured to control the lighting load 214 and the emergency lighting load 216. The input and output connections to the emergency controller 202 will be described in greater detail in the following paragraphs.

As described above, the emergency controller 202 may be configured to receive inputs from the O/V sensor 210, the daylight sensor 208, and the UI panel 204. Further, the emergency controller 202 may be configured to receive utility power supply wiring 240 as an input. The utility power supply wiring 240 may provide utility power to the emergency controller 240 for operation of various components and modules within the emergency controller 240. The various components and modules internal to the emergency controller 202, and the operation of the emergency controller 202 will be described in greater detail in association with FIG. 3.

In an example embodiment, the utility power supply wiring 240 may be a 3-wire, single phase power supply wiring that includes two live wires (black and blue), each supplying 120V and a third neutral wire (white/orange or white/black). In another example embodiment, the utility power supply wiring 240 may be a 4-wire, 3 phase utility power supply wiring which includes 3 wires, each supplying 120V that are out of phase and a fourth neutral wire. One of ordinary skill in the art can understand and appreciate that any other appropriate power delivery mechanism could be used to deliver utility power to the emergency controller, without departing from the broader spirit of the disclosure.

In one embodiment, as illustrated in FIG. 2, a lead may be drawn from the neutral wire of the utility power supply wiring and coupled to an input of each of the lighting loads 214a, 214b, 214c associated with the emergency controller 202.

In addition to the utility power supply wiring, the emergency controller 202 may be adapted to receive emergency power supply live wire 246 as an input. In the example embodiment illustrated in FIG. 2, the emergency neutral wire 248 may be directly coupled to an input of the emergency lighting load 216, while the emergency power supply live wire 246 is coupled to the emergency controller 202. However, in some embodiments, along with the emergency power supply live wire 246, the emergency neutral wire 248 may be coupled to the emergency controller 202 as well.

In one embodiment, the emergency controller 202 may be configured to output dimming control signals for each of the lighting loads 214 and the emergency lighting loads 216. The emergency controller 202 may transmit the dimming control signals to the different lighting loads over one or more dimming control wires 218. Further, the dimming control signals delivered to one lighting load (e.g., lighting load 218c) may be coupled to the emergency lighting load 216 as well. In other words, the same dimming control signals may be transmitted both to lighting load 1 214c and the emergency lighting load 216 in order to synchronize the dimming operations of the emergency lighting load 216 with the lighting load 214c. In other words, the dimming operations of the emergency lighting load 216 track the dimming operations of at least one of the lighting loads to provide consistent lighting in the room when utility power is uninterrupted.

In addition, the emergency controller 202 may be configured to output operational voltages that drive the lighting loads, for example lighting load 1 214c, and the emergency lighting load 216. The operational voltage output from the emergency controller 202 may be delivered to the lighting loads over the lighting relay output wires 252, 254, and/or 256 that electrically couple the emergency controller 202 to the lighting loads (214a, b and/or c). Further, the operational voltage output from the emergency controller 202 may be delivered to the emergency lighting load over an emergency relay output wire 250 that electrically couples the emergency controller 202 to the emergency lighting load 216. In one embodiment, the automatic emergency load control system may be configured such that the operation of the emergency lighting load 216 tracks the operation of at least one of the lighting loads (e.g., lighting load 214c).

In one embodiment, the emergency controller 202 may be configured such that the emergency lighting load 216 is operated in conjunction with at least one of the lighting loads, thus providing a single control for both the emergency lighting load 216 and the at least one lighting load (e.g., lighting load 1 214c). Consequently, the emergency lighting load 216 and the at least one lighting load (e.g., lighting load 1 214c) may operate synchronously in that the emergency lighting load and the lighting load may switch on, switch off, and/or dim synchronously. The internal configuration and the operation of the emergency controller 202 may be described in greater detail below, in association with FIG. 3.

Figure 3:
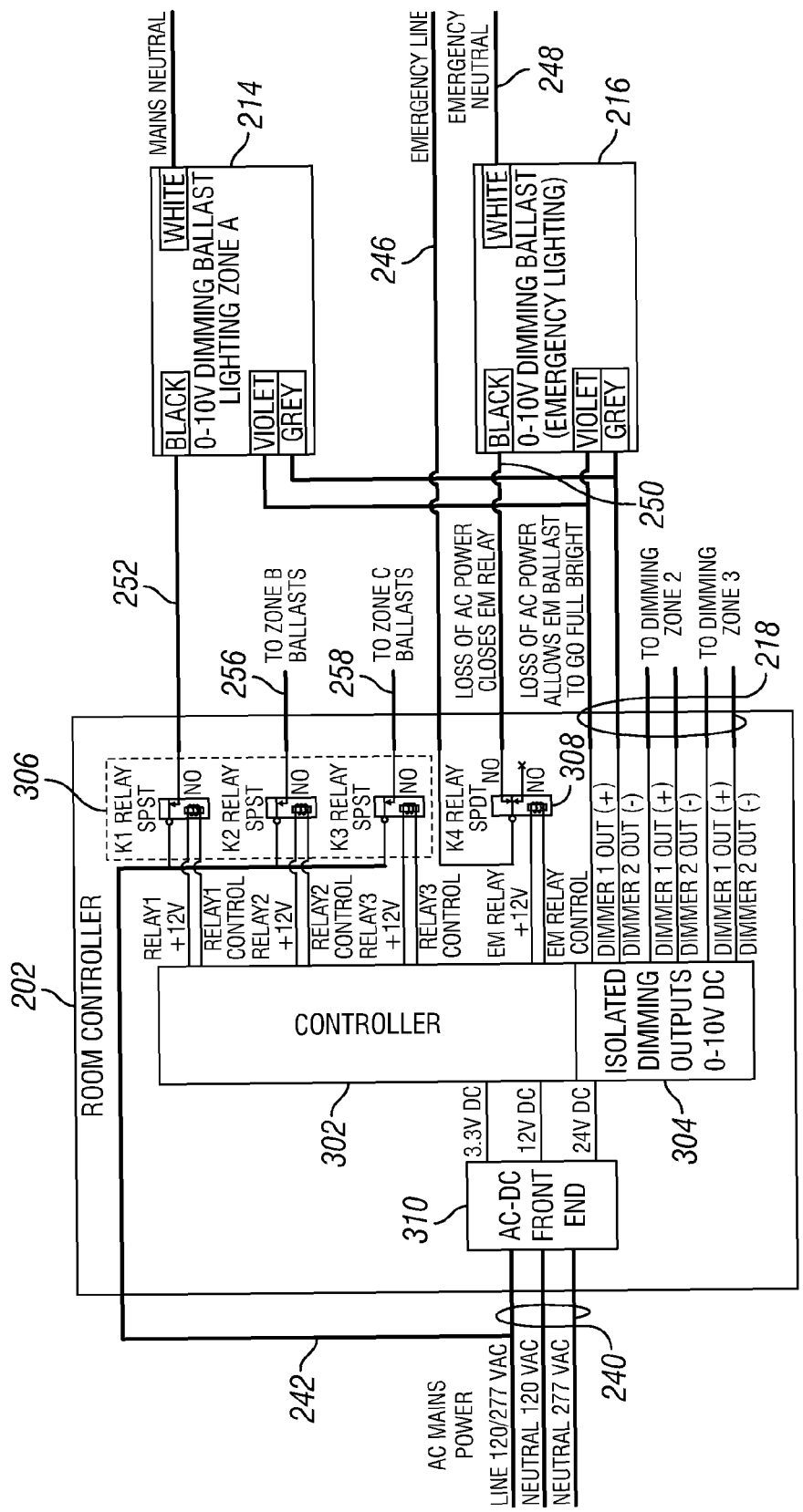
FIG. 3 illustrates an internal view of an automatic emergency lighting load controller, according to certain example embodiments of the present disclosure.

FIG. 3 illustrates an internal view of an automatic emergency lighting load controller, according to certain example embodiments. In particular, FIG. 3 illustrates an emergency controller 202, an emergency power controller 302, a dimmer control circuit 304, an AC to DC converter 310, one or more lighting relay controls 306, an emergency relay control 308, a lighting load 214, an emergency lighting load 216, lighting relay output wires 252, 254, 256, emergency relay output wire 250, utility power supply lines 240 and 242, emergency power supply lines 246 and 248, and dimmer control lines 218.

In an example embodiment, as illustrated in FIG. 3, the emergency controller 202 may include a dimmer control circuit 304 to control dimming operations of any lighting fixtures associated with the emergency controller 202, i.e., both normal lighting fixtures and emergency lighting fixtures. Dimming control signals from the dimmer control circuit 304 may be transmitted to both the lighting load 214 and the emergency lighting load 216 for an in sync dimming operation of both the emergency lighting load 216 and lighting loads 214.

In addition to the dimming control circuit 304, the emergency controller 202 may include an emergency power controller circuit 302 (herein 'power controller') that is coupled to the dimmer control circuit 304, the AC to DC converter 310, the light relay controls 304, and the emergency relay control 308. In an example embodiment, the power controller 302 may be a microcontroller or a microprocessor. The emergency power controller 302 may be configured to control the operation of the lighting relay controls 306 and the emergency relay control 308 such that emergency power supply may be fed to the emergency lighting load responsive to detecting a power outage. When utility power supply is interrupted, the power controller 302 may enter an emergency power mode wherein the power controller 302 is configured to cut off the utility power supply and dimming control signal to the emergency lighting load and couple the emergency lighting load 216 to an emergency power supply. In other words, the power controller 302 may be configured to send the emergency lighting fixtures to full bright in a power outage situation. Alternately described, responsive to a power outage, the power controller 302 of the emergency controller 202 may force the emergency lighting fixtures to change to full brightness.

In a normal mode of operation, the power controller 302 may be configured to supply utility power and dimming control signals to the lighting load 214 and the emergency lighting load 216 such that the emergency lighting load 216 tracks an operation of the lighting load 214.

In one embodiment, lighting relay control 306 may be a single pole single throw (SPST) relay switch that is configured to switch on or switch off based on lighting relay control signals received from the power controller 302. When the switch is on, the lighting relay 306 delivers utility power from the AC mains to the lighting load 214 over the lighting relay output line 252. Further, the power controller 302 may be pre-programmed or pre-configured such that at least one of the lighting relay control 306 and the emergency relay control 308 are operated synchronously. For example, when the K1 lighting relay control 306 is switched on, the emergency relay control 308 will be switched on as well. Accordingly, when the lighting relay control 306 is switched on, the emergency power supply is cut off from the emergency lighting load by the emergency relay control 308, and the dimming control signals and/or the AC main supply from the utility power line may be coupled to the emergency lighting load 216. In other words, the emergency lighting switches on when the lighting connected to the lighting load 216 is switched on. Further, the dimming of the emergency lighting is also synchronous with the dimming of the lighting connected to the lighting load 216, both of which are controlled by the same dimming control signals.

In one embodiment, the emergency relay control 308 may be a single pole double throw (SPDT) relay switch, where the switch operates such that when the relay is switched on the emergency power supply is cut off from the emergency lighting load and when the relay is switched off the emergency power supply is coupled to the emergency lighting load driving the emergency lighting to full bright.

One of ordinary skill in the art can understand and appreciate that even though the lighting relay switch and the emergency lighting relay switch are described herein as formed by an SPST, SPDT, and/or a DPDT switch, any other appropriate relay based or non-relay based switch may be used in each circuit, without departing from the broader spirit of the disclosure.

When a power outage occurs or when the utility power supply (AC mains supply) to the emergency controller 202 over the utility power line 242 is interrupted, the power controller 302 may turn off thereby cutting off the relay control signals that control the lighting relay 306 and the emergency relay 308. Upon loss of utility power, the emergency relay 308 may be configured to close and thereby couple the emergency power supply to the emergency lighting load 216. Further, when the utility power is interrupted, the dimmer control circuit 304 is turned off thereby cutting off the dimmer control signals to the lighting load and the emergency lighting load. Thus, when the utility power is interrupted, the emergency controller cuts off the dimmer control signals and the utility power supply to the emergency lighting load 216 and the emergency relay shunts the emergency power supply to the emergency lighting load 216 thereby driving the emergency lighting to full bright. Later when the utility power is restored, the emergency controller 202 switches back to the normal mode of operation where the emergency lighting and at least one of the lights coupled to the lighting load are operated in sync as described above.

In addition to the normal mode of operation and the emergency mode, the emergency controller may include a test mode. The test mode may be activated by an end user using the UI panel 204. When the end user selects the 'all off' input in the UI panel 204, a set number of times within a set period of time, the test mode may be activated. For example, when the 'all off' input on the UI panel 204 is selected 4 times within 60 seconds, the test mode may be activated. Upon activation of the test mode, the emergency controller may simulate, emulate or create a utility power interruption scenario by cutting off the utility power supply and dimmer control signals to the emergency lighting load. Further, the emergency controller 202 couples the emergency power supply to the emergency lighting load to test if the emergency lights go to full bright upon interruption of utility power.

In addition to the power controller 302, the dimmer control circuit 304, the lighting relay control 306, and the emergency relay control 308, the emergency controller 302 may include an AC to DC converter configured to convert incoming utility AC power to a DC power that is used to drive the operations of the power controller 302 and the dimmer control circuit 304.

Further, the wiring to the emergency controller may be color coded for easy installation. For example, the color of the emergency power supply live wire 246 may be matched to the color of one of utility power supply input wire 242 (live wire). In another example, the emergency relay output wire 250 and the lighting relay output wire 252 are both colored yellow to illustrate to a user that these two loads are controlled together automatically.

From the description of the example embodiments, equivalents of the elements shown therein will suggest themselves to those skilled in the art, and ways of constructing other embodiments will appear to practitioners of the art. Therefore, the scope of the present disclosure is to be limited only by the claims that follow. Further, the specification and drawings are to be regarded in an illustrative rather than a restrictive sense.

What is claimed is:

1. An automatic emergency load control device, comprising:
   a lighting relay that is adapted to be coupled to a lighting load based on a relay control signal input;
   an emergency relay that is adapted to be coupled to an emergency lighting load based on an emergency relay control signal input;
   a dimmer control circuit coupled to the lighting load and the emergency lighting load and configured to control dimming operations associated with the lighting load and the emergency lighting load; and
   a power controller coupled to the lighting relay and the emergency relay and configured to output the relay control signal input to the lighting relay and the emergency relay control signal input to the emergency relay to control the operation of the lighting load and the emergency lighting load respectively.

2. The automatic emergency load control device of claim 1, wherein when utility power is uninterrupted, the lighting relay is configured to provide the utility power to the lighting load for operation of the lighting load.

3. The automatic emergency load control device of claim 1, wherein when utility power is uninterrupted, the emergency relay is configured to provide the utility power to the emergency lighting load.

4. The automatic emergency load control device of claim 1, wherein when utility power is interrupted, the emergency relay is configured to provide emergency power to the emergency lighting load.

5. The automatic emergency load control device of claim 1, wherein an input of the emergency relay is coupled to an emergency power supply line.

6. The automatic emergency load control device of claim 1, wherein, when utility power is interrupted, the power controller is configured to deliver emergency power to the emergency lighting load via the emergency relay.

7. The automatic emergency load control device of claim 1, wherein the dimming control circuit controls the dimming operations such that the lighting load and the emergency lighting load operate synchronously.

8. A system, comprising:
   one or more sensors to determine at least one lighting characteristic of a monitored space;
   a user input panel to receive a selection of a mode of operation;
   an emergency room controller to control an operation of a lighting load and an operation of an emergency lighting load based on availability of a utility power to the emergency room controller and one of the at least one lighting characteristic of the monitored space and the mode of operation,
      wherein the one or more sensors and the user input panel are coupled to an input of the emergency room controller, and
      wherein one or more outputs of the emergency room controller is coupled to an input of the lighting load and an input of the emergency lighting load.

9. The system of claim 8, wherein when the utility power to the emergency room controller is uninterrupted, the emergency room controller is configured to control the operation of the lighting load and the operation of the emergency lighting load such that the lighting load and the emergency lighting load operate synchronously.

10. The system of claim 8, wherein when the utility power to the emergency room controller is interrupted, the emergency room controller is configured to turn on an emergency light source associated with the emergency lighting load to full brightness.

11. The system of claim 8, wherein when the utility power to the emergency room controller is interrupted, the emergency room controller is configured to deliver emergency power to the emergency lighting load.

12. The system of claim 8, wherein the emergency room controller controls the operation of the lighting load through a lighting relay, and wherein the emergency room controller controls the operation of the emergency lighting load through an emergency lighting relay.

13. The system of claim 8, wherein the emergency room controller comprises a dimmer control circuit that is configured to generate dimming control signals for controlling dimming operations associated with the lighting load and the emergency lighting load.

14. The system of claim 8, wherein the mode of operation associated with the user input panel comprises a test mode configured to initiate a test operation associated with the emergency room controller.

* * * * *